US012612921B1

(12) United States Patent
Miller et al.

(10) Patent No.: US 12,612,921 B1
(45) Date of Patent: Apr. 28, 2026

(54) FAN BEARING SUPPORT SYSTEM FOR GAS TURBINE ENGINE WITH POWER GEARBOX

(71) Applicant: GENERAL ELECTRIC COMPANY, Evendale, OH (US)

(72) Inventors: Brandon W. Miller, Liberty Township, OH (US); Ryan T. Roehm, West Chester, OH (US); Andrew Hudecki, Milford, OH (US); Arthur W. Sibbach, Boxford, MA (US); Mark Wotzak, Lynn, MA (US); Ravindra Shankar Ganiger, Bengaluru (IN); Andrew Gumpert, West Chester Township, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/289,029

(22) Filed: Aug. 2, 2025

(30) Foreign Application Priority Data

Feb. 3, 2025 (IN) .............................. 202511008747

(51) Int. Cl.
| | |
|---|---|
| *F04D 29/059* | (2006.01) |
| *F02C 7/36* | (2006.01) |
| *F16C 19/16* | (2006.01) |

(52) U.S. Cl.
CPC .............. *F04D 29/059* (2013.01); *F02C 7/36* (2013.01); *F16C 19/166* (2013.01); *F05D 2240/52* (2013.01); *F05D 2240/54* (2013.01); *F05D 2260/40311* (2013.01); *F16C 2360/46* (2013.01)

(58) Field of Classification Search
CPC ......... F04D 29/059; F02C 7/36; F16C 19/166
See application file for complete search history.

(56) References Cited

U.S. PATENT DOCUMENTS

| | | | | |
|---|---|---|---|---|
| 6,082,959 | A | * | 7/2000 | Van Duyn ............... F01D 25/16 |
| | | | | 415/174.4 |
| 6,264,138 | B1 | | 7/2001 | Hawkins |
| 6,491,497 | B1 | * | 12/2002 | Allmon ................. F16C 23/084 |
| | | | | 384/624 |
| 6,966,865 | B2 | | 11/2005 | Drago et al. |
| 11,248,533 | B2 | * | 2/2022 | Chilton ................... F01D 25/20 |

(Continued)

FOREIGN PATENT DOCUMENTS

| | | |
|---|---|---|
| CN | 201606450 U | 10/2010 |
| CN | 208831653 U | 5/2019 |

(Continued)

*Primary Examiner* — Eldon T Brockman
(74) *Attorney, Agent, or Firm* — Carter, DeLuca & Farrell LLP

(57) ABSTRACT

A fan rotor bearing support system for a turbine engine having a power gearbox includes a first bearing assembly mounted on a proximal portion of a fan rotor of a fan section of the turbine engine and a second bearing assembly mounted on a more distal portion of the fan rotor proximal of a fan hub of the fan section. The first bearing assembly includes a four point ball bearing with limited clearance between the balls of the bearing assembly and the races of the bearing assembly to limit axial movement of the fan rotor in relation to the power gearbox. The second bearing assembly includes a low profile roller bearing to facilitate a reduction in the fan hub ratio of the turbine engine.

18 Claims, 4 Drawing Sheets

(56)     References Cited

U.S. PATENT DOCUMENTS

| 12,054,276 | B2 | 8/2024 | Maxwell | |
| 2018/0334923 | A1* | 11/2018 | Leeder | F01D 21/08 |
| 2020/0080496 | A1* | 3/2020 | Lemarchand | F02K 3/06 |
| 2020/0370479 | A1* | 11/2020 | Chilton | F01D 25/20 |

FOREIGN PATENT DOCUMENTS

| CN | 212928722 U | 4/2021 |
| CN | 220791807 U | 4/2024 |
| DE | 102011085204 A1 | 5/2013 |
| JP | 2015218805 A | 12/2015 |

* cited by examiner

FAN BEARING SUPPORT SYSTEM FOR GAS TURBINE ENGINE WITH POWER GEARBOX

TECHNICAL FIELD

The present disclosure relates generally to a fan bearing support system for a gas turbine engine having a power gearbox.

BACKGROUND

A turbine engine generally includes a fan and a core section arranged in flow communication with one another. The fan includes a fan rotor that is coupled to a shaft of the turbine engine to rotate the fan rotor. A power gearbox can be coupled to the shaft of the turbine engine to reduce the speed of the fan in relation to the that of the shaft.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
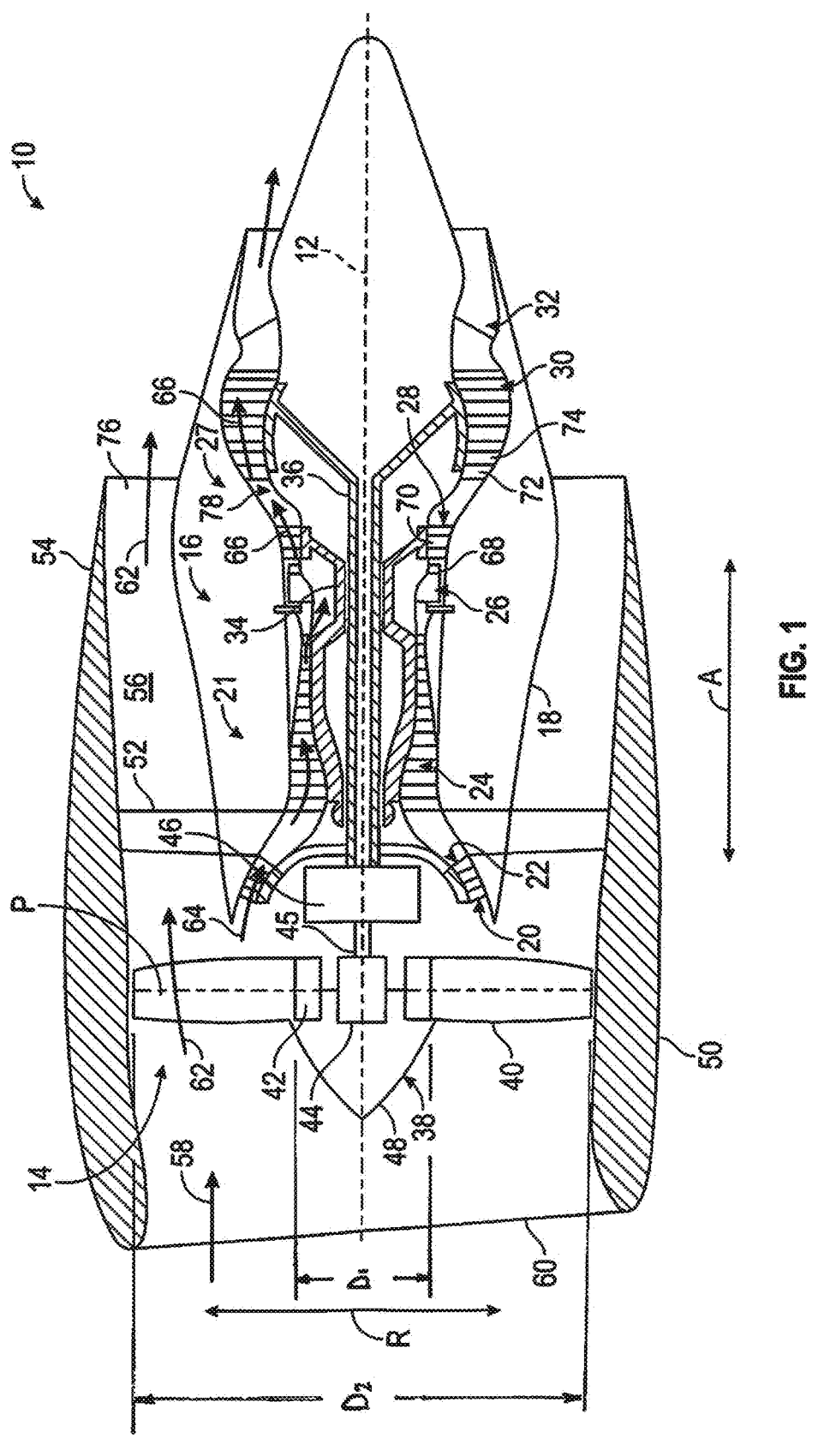
FIG. 1 is a schematic cross-sectional diagram of a ducted turbine engine, taken along a centerline axis of the turbine engine, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," and "second," may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the term "axial" refers to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power from a turbine shaft to a main fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from the turbine shaft operating at a first speed to a fan rotor rotating at a second, lower speed. For a planetary configuration of the gearbox, the sun gear may be coupled to the mid-shaft of a lower pressure turbine rotating at the first speed. The planet gears, intermeshed with the sun gear, then transfer this torque to the fan rotor through a planet carrier. In a star configuration, the ring gear is coupled to the fan rotor.

FIG. 1 is a schematic cross-sectional diagram of a ducted turbine engine 10, taken along a centerline axis 12 of the turbine engine 10, according to an embodiment of the present disclosure. FIG. 1 shows the turbine engine 10 defines an axial direction A (extending parallel to the centerline 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

The fan section 14 of the turbine engine 10 includes a fan 38 (e.g., a variable pitch fan) having a plurality of fan blades 40 coupled to a hub 42 in a spaced manner. As depicted in FIG. 1, the fan blades 40 extend outwardly from the hub 42 generally along the radial direction R. In some aspects of the disclosure, each fan blade 40 is rotatable relative to the hub 42 about a pitch axis P by virtue of the fan blades 40 being operatively coupled to an actuation member 44 configured to collectively vary the pitch of the fan blades 40 in unison. The fan blades 40, the hub 42, and the actuation member 44 are together rotatable about the longitudinal centerline 12 via a fan rotor 45 that is powered by the LP shaft 36 across a power gearbox 46. The power gearbox 46 includes a plurality of gears for adjusting the rotational speed of the fan rotor 45 and, thus, the fan 38 relative to the LP shaft 36 to a more efficient rotational fan speed.

Referring still to the exemplary embodiment of FIG. 1, the hub 42 is covered by a hub cover 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This thereby supports operation of the LP compressor 22 and rotation of the fan 38 via the gearbox assembly 46.

The combustion gas 66 is subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it should be appreciated that, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

To avoid driving excess axial loads into the power gearbox transmitted through the fan rotor, an unmet need is the appropriate structure to minimize axial movement of the fan rotor in relation to the power gearbox. In geared engines, special bearing configurations are necessary to limit axial play into the power gearbox. The power gearbox is sensitive to axial deflections due to bihelical gear mesh within the power gearbox. To improve fan efficiency, it may be desirable to decrease the fan hub ratio. The fan hub ratio is the proportion of the fan's central hub diameter ($D_1$) to the overall diameter of the fan ($D_2$)

$$\text{Fan Hub Ratio} = \text{Diameter of Fan Hub/Total Diameter of Fan}$$

wherein the total diameter of the fan is the distance between the leading edge tips of diametrically opposed fan blades. The fan hub ratio impacts the aerodynamics and efficiency of the engine. A smaller hub ratio, i.e., a smaller fan hub and/or larger fan blades, allows more air to be moved around the engine core to enhance thrust and fuel efficiency. A lower fan hub ratio often correlates with a higher bypass ratio, i.e., the ratio of the mass of air that bypasses the engine core to the mass of the air that travels through the engine core. Higher bypass ratio engines have large fans that move a large volume of air around the core improving fuel efficiency, reducing noise, and providing smoother thrust at subsonic speeds.

Figure 2:
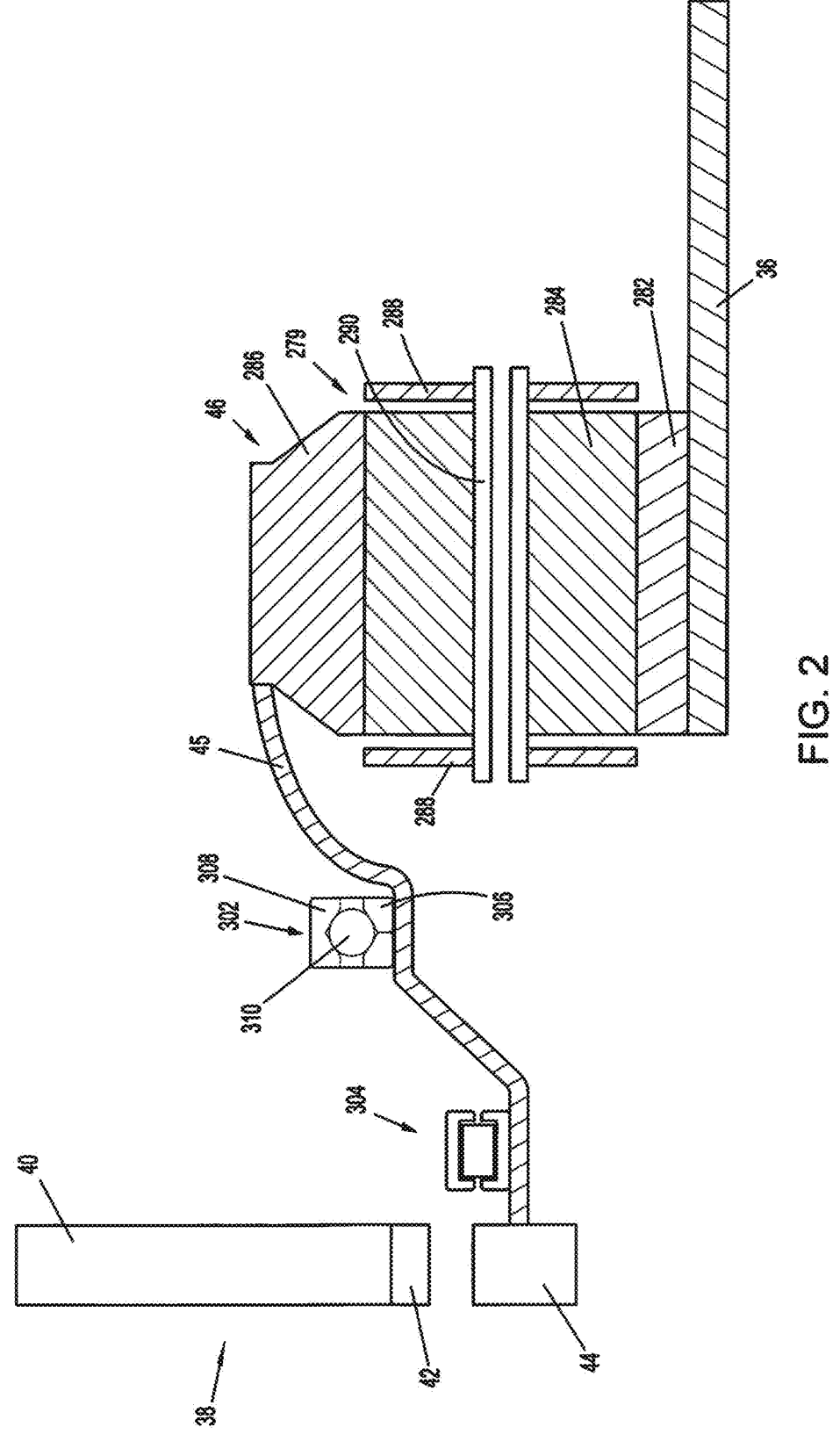
FIG. 2 is a schematic cross-sectional diagram of power gearbox, fan assembly, and fan bearing support system of the ducted turbine engine shown in FIG. 1.

FIG. 2 is a schematic, cross-sectional side view of a power gearbox 46, fan rotor 45, and fan rotor bearing support system 300 according to aspects of the present disclosure. The power gearbox 46, fan rotor 45, and fan rotor bearing support system 300 may be employed in the turbine engine 10 of FIG. 1. That is, the power gearbox 46 couples the LP shaft 36 to the fan 38 (FIG. 1) via the fan rotor 45.

The power gearbox 46 includes a gear arrangement having an epicyclic gear assembly 279 including a sun gear 282, a plurality of planet gears 284 (only one of which is visible in FIG. 2), and a ring gear 286. For clarity, only a portion of the gears is shown. Although not depicted in FIG. 2, each of the sun gear 282, the plurality of planet gears 284, and the ring gear 286 comprises teeth about their periphery to intermesh with the other gears. The power gearbox 46 is a star type or a rotating ring gear type gearbox assembly (e.g., the ring gear 286 is rotating and a planet carrier 288 is fixed and stationary). In such an arrangement, the fan 38 is driven by the ring gear 286. In this way, the ring gear 286 is an output of the power gearbox assembly 46. However, other suitable types of power gearbox 46 may be employed. In one non-limiting example, the power gearbox 46 may have a planetary arrangement, in which the ring gear 286 is held fixed, and the planet carrier 288 is allowed to rotate. In such an arrangement, the fan 38 is driven by the planet carrier 288 (FIG. 2, 45'). In this way, the planet carrier 288 is the output of the power gearbox 46. In another non-limiting example, the power gearbox 46 may be a differential gearbox in which the ring gear 286 and the planet carrier 288 are both allowed to rotate.

A drive shaft (e.g., the LP shaft 36) is coupled to the sun gear 282. In this way, the sun gear 282 is an input of the power gearbox assembly 46. Radially outward of the sun gear 282, and intermeshing therewith, is the plurality of planet gears 284 that are coupled together and supported by the planet carrier 288. The planet carrier 288 is coupled to the planet gears 284 by a journal pin 290 and supports and constrains the plurality of planet gears 284 such that the plurality of planet gears 284 do not rotate as a unit around the sun gear 282 while enabling each planet gear of the plurality of planet gears 284 to rotate about its own axis 13. Radially outwardly of the plurality of planet gears 284, and intermeshing therewith, is the ring gear 286, which is an annular ring gear. The ring gear 286 is coupled via the fan rotor 45 to the fan 38 (FIG. 1) and rotates to drive rotation of the fan 38 (FIG. 1) about the longitudinal centerline 12. In this way, the ring gear 286 drives an output of the power gearbox 46. In the planetary configuration, the planet carrier 288 drives the output of the power gearbox 46.

Figure 3:
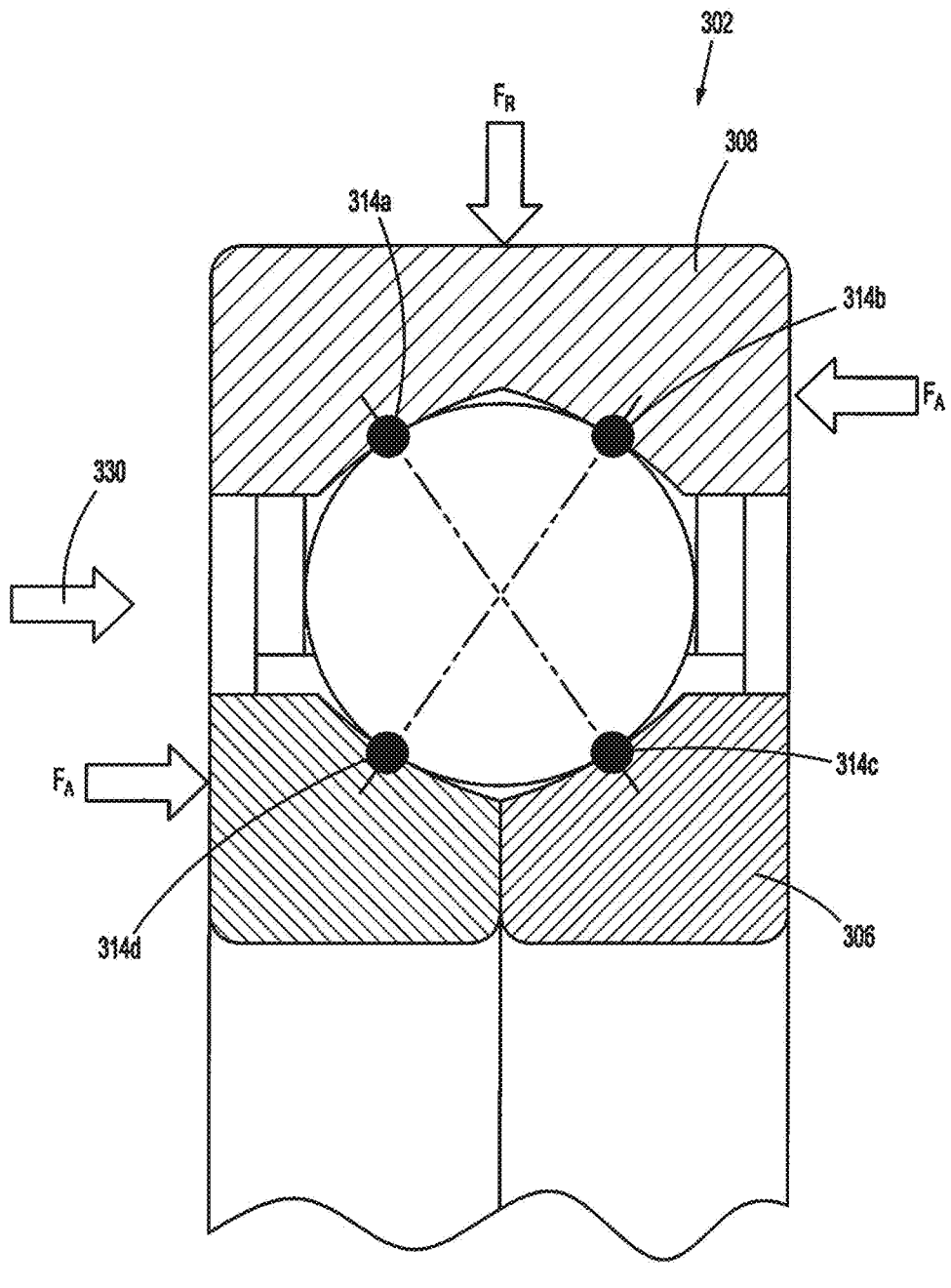
FIG. 3 is a cross-sectional view taken through a first bearing assembly of the fan bearing support system shown in FIG. 2.

The fan rotor bearing support system 300 includes a first bearing assembly 302 and a second bearing assembly 304 that is axially spaced from the first bearing assembly 302 in a proximal direction. The first bearing assembly 302 illustrated in FIG. 3 is positioned proximally of the second bearing assembly 304 and includes an inner race 306, an outer race 308, and balls 310 received between the inner race 306 and the outer race 308. The inner race 306 is directly coupled to the fan rotor 45 and the outer race 308 is coupled to the engine housing or to other stationary support structure. In aspects of the disclosure, the inner race 306 has a split ring configuration to facilitate easier mounting of the bearing and improved precision. In some aspects of the disclosure, the first bearing assembly 302 is a four point contact ball bearing wherein each of the inner and outer races 306 and 308 defines a concavity having a gothic arch 312 to allow the ball 310 to have four contact points 314a-314d with the inner and outer races 306 and 308, two contact points 314a-b on the outer race 308 and two contact points 314c-d on the inner race 306. Contact between the balls 310 and the inner and outer races 306 and 308 can occur at angles between 20 degrees and 50 degrees. The four point contact ball bearing design allows the first bearing assembly 302 to handle both radial loads FR and axial loads FA by transmitting the load between the contact points 314b and 314d and between contact points 314a and 314c.

In aspects of the disclosure, the first bearing assembly 302 has a tight bearing configuration, i.e., there is minimal clearance between the balls 310 and the inner and outer races 306 and 308. In some aspects of the disclosure, the clearance between the balls 310 and the inner and outer races 306 and 308 is dimensioned to limit axial movement of the fan rotor 45 in relation to the power gearbox 46 to between 0.005 inches or 5 mil and 0.010 inches or 10 mil. In some aspects of the disclosure, the clearance between the balls 310 and the inner and outer races 306 and 308 is dimensioned to limit axial movement of the fan rotor 45 to between 0.005 inches or 5 mil and 0.007 inches or 7 mil. The first bearing assembly 302 limits axial endplay, i.e., axial movement of the fan rotor 45 in relation to the power gearbox 46, thus protecting the power gearbox 46 from excessive stress and facilitating a reduction in size and extension of the life of the power gearbox 46. It is also envisioned that the second bearing assembly 304 could be a four point contact roller bearing similar to the first bearing assembly 302.

Due to the tight clearances, adequate lubrication must be provided to the first bearing assembly 302. This lubrication can be provided via an oil jet 330 positioned under the inner race 306 of the first bearing assembly 302, under the fan rotor 45, or into or between the gothic arch 312 of the inner and/or outer races 306 and 308. The lubricant can be a high-temperature synthetic oil or other solid lubricant such as molybdenum disulfide.

In aspects of the disclosure, the second bearing assembly 304 is positioned proximally to the hub 42 of the fan section 14 and includes an inner race 340 secured to the fan rotor 45, an outer race 342 coupled to the engine housing or to other stationary support structure, and a bearing member 344. In some aspects of the disclosure, the second bearing assembly 304 is a simple roller bearing and the bearing member 344 includes cylindrical rollers 345 (only one is shown) positioned between the inner race 340 and the outer race 342. The roller bearing has a low radial profile positioned near but proximal to the hub 42 to allow for a reduced fan hub ratio. In aspects of the disclosure, the fan hub ratio is between about 0.20 and 0.29. It is also envisioned that the second bearing assembly 304 could be a four point contact roller bearing similar to the first bearing assembly 302.

The first bearing assembly 302 and the second bearing assembly 304 are designed to withstand extreme conditions including high temperatures, high loads, and high rotational speeds. The materials used to construct these bearing assemblies are selected to maximize durability, temperature resistance, and fatigue life. In aspects of the disclosure, the first bearing assembly 302 and the second bearing assembly 304 can be formed from steel, steel alloys, ceramic materials, cobalt and nickel-based superalloys, and/or polytetrafluoroethylene (PTFE) and phenolic resins. In addition, the first and second bearing assemblies may receive coatings such as titanium nitride or other anti-friction coatings to further reduce wear and minimize friction.

Figure 4:
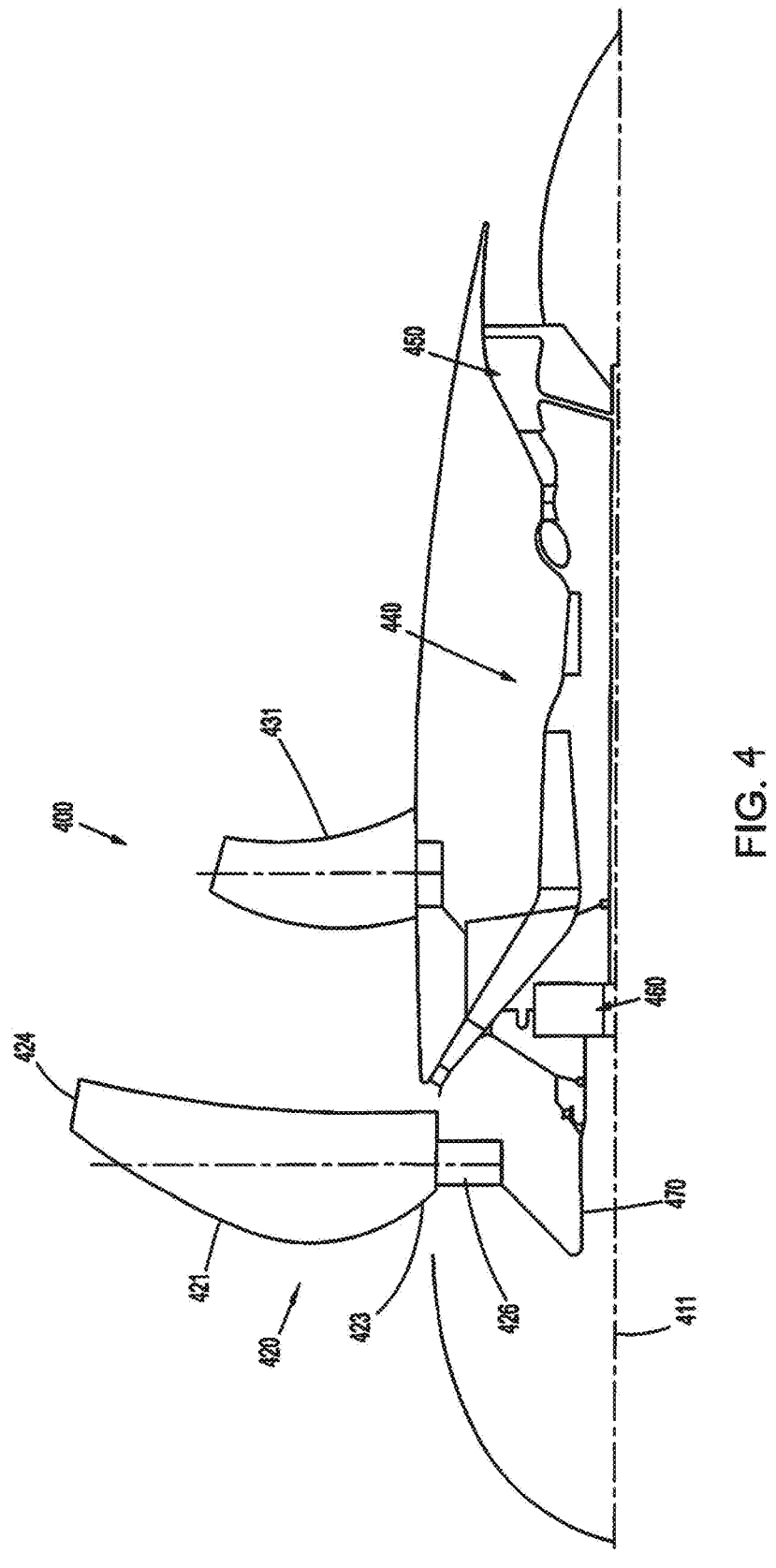
FIG. 4 is schematic cross-sectional diagram of an unducted turbine engine, taken along a centerline axis of the turbine engine, according to another embodiment of the present disclosure.

The fan rotor bearing support system 300 illustrated in FIGS. 2 and 3 can be also integrated into other types of turbine engines including open or unducted turbine engines such as illustrated schematically in FIG. 4 as turbine engine 400. Turbine engine 400 takes the form of an open rotor propulsion system and has a turbine section 410 and a fan section 420 which includes an array of fan blades 421 around a centerline 411 of the turbine engine 400. The blades 421 are arranged in equally spaced relation around the centerline 411, and each blade 421 has a root 423, a tip 424, and a span defined therebetween. The roots 423 are supported on a hub 426 which is coupled to and rotatable with a fan rotor 470. The turbine engine 400 includes a turbine section 440 including a low-pressure turbine 450. The low-pressure turbine 450 is coupled to the fan rotor 470 of the fan section 420 via a power gearbox 460 like the power gearbox 46 described above. Left- or right-handed engine configurations can be achieved by mirroring the fan blades 421 and 431. The power gearbox 460 as described above couples the low-pressure turbine to the fan rotor 470 to decrease the rotational speed of the fan blades 421 relative to the low-pressure turbine 450.

Open or unducted turbine engines such as turbine engine 400 operate without a surrounding duct, e.g., nacelle 50, about the fan blades 421. The fan blades 421 are exposed to open air and can have larger diameters than the fan blades in ducted engines to allow for better efficiency in moving large volumes of air. The drag and weight associated with the nacelle are eliminated to maximize fuel efficiency and provide high thrust.

The fan rotor bearing support system 300 shown in FIG. 2 can be used to support the fan rotor 470 of the turbine engine 400 between the power gearbox 460 and the hub 426. As described above, the first bearing assembly 302 (FIG. 2) is axially spaced from the second bearing assembly 304. The distance of axial spacing can vary according to the requirements of the turbine engine but the second bearing assembly 304 is spaced proximally to the hub 426 of the fan section 420. The fan rotor bearing support system 300 provides similar benefits to the turbine engine 400 as described above regarding the turbine engine 10 in that the first bearing assembly 300 limits axial endplay into the power gearbox 460 to facilitate a reduction in size and extension of the life of the power gearbox 46, and the second bearing assembly 304 has a low radial profile to maintain a low fan hub ratio. In aspects of the disclosure, the fan hub ratio of turbine engine 400 is between 0.20 and 0.40.

In geared engines, special bearing configurations are necessary to limit axial play into the power gearbox. The power gearbox is sensitive to axial deflections due to bihelical gear mesh within the power gearbox. The disclosed fan rotor bearing support system including the first bearing assembly and the second bearing assembly can limit axial play into the power gearbox to protect the power gearbox from excessive stress and facilitate a reduction in size and extension of the life of the power gearbox while improving efficiency.

Further aspects are provided by the subject matter of the following clauses:

A turbine engine comprising: a turbine defining a centerline, the turbine including a turbine shaft rotatable about the centerline; a fan section including a fan rotor, a hub coupled to the fan rotor, and fan blades coupled to the hub, the fan section rotatable about the centerline, the hub having a first diameter $D_1$ and the fan section having a second diameter $D_2$, wherein $D_1/D_2$ defines a fan hub ratio; a power gearbox including a gear arrangement, the turbine shaft coupled to a first gear of the gear arrangement and the fan rotor coupled to a second gear of the gear arrangement, wherein the gear arrangement is configured to reduce a speed of the fan rotor in relation to a speed of the turbine shaft; and a fan rotor bearing support system including a first bearing assembly and a second bearing assembly, the first bearing assembly including a four point ball bearing including balls, an inner race secured to the fan rotor adjacent to the power gearbox and an outer race secured to stationary support structure of turbine engine, the second bearing assembly including a roller bearing including an inner race secured to the fan rotor and an outer race secured to the support structure of the turbine engine, the second bearing assembly positioned distally of the first bearing assembly and proximally of the fan hub.

The turbine engine according to any other clause, wherein the fan hub ratio is between 0.20 and 0.40.

The turbine engine according to any other clause, wherein the first bearing assembly has a tight bearing configuration with a clearance between the balls and the inner and outer races of the first bearing assembly between 5 mil and 10 mil.

The turbine engine according to any other clause, wherein the first bearing assembly has a tight bearing configuration with a clearance between the balls and the inner and outer races of the first bearing assembly of between 5 mil and 7 mil.

The turbine engine according to any other clause, wherein the inner race and the outer race of the first bearing assembly define gothic arches.

The turbine engine according to any other clause, wherein the turbine engine is a ducted turbine engine, and the fan hub ratio is between 0.20 and 0.29.

The turbine engine according to any other clause, wherein the turbine includes a high-pressure turbine, a high-pressure turbine shaft, a low-pressure turbine and a low-pressure turbine and a low-pressure turbine shaft, the low-pressure turbine shaft coupled to the gear arrangement.

The turbine engine according to any other clause, wherein the gear arrangement includes an epicyclic gear assembly including a sun gear, a plurality of planet gears, and a ring gear.

The turbine engine according to any other clause, wherein the fan rotor is coupled to the ring gear.

The turbine engine according to any other clause, wherein the fan rotor is coupled to the plurality of planetary gears.

The turbine engine according to any other clause, further including a lubrication oil jet for supplying lubrication oil to the first bearing assembly and/or the second bearing assembly.

The turbine engine according to any other clause, wherein the lubrication oil jet is positioned to supply lubrication oil under the first bearing assembly, between the gothic arches of the first bearing assembly, or axially into the first bearing assembly.

The turbine engine according to any other clause, wherein the first bearing assembly and/or the second bearing assembly is formed from ceramic materials.

The turbine engine according to any other clause, wherein contact between the balls 310 and the inner and outer races 306 and 308 of the first bearing assembly occurs at angles from 20 degrees to 50 degrees.

A turbine engine comprising: a turbine defining a centerline, the turbine including a turbine shaft rotatable about the centerline; a fan section including a fan rotor, a hub coupled to the fan rotor, and fan blades coupled to the hub, the fan section rotatable about the centerline, the hub having a diameter $D_1$ and the fan section having a second diameter $D_2$, wherein $D_1/D_2$ defines a fan hub ratio; a power gearbox including an epicyclic gear assembly including a sun gear, planetary gears, and a ring gear, the turbine shaft coupled to one gear of the epicyclic gear assembly, and the fan rotor coupled to another of the gears of the epicyclic gear assembly; and a fan rotor bearing support system including a first bearing assembly and a second bearing assembly, the first bearing assembly including a four point ball bearing including balls, an inner race secured to the fan rotor adjacent to the power gearbox and an outer race secured to stationary support structure of turbine engine, the second bearing assembly including a roller bearing including an inner race secured to the fan rotor and an outer race secured to the support structure of the turbine engine, the second bearing assembly positioned distally of the first bearing assembly and proximally of the fan hub, wherein the fan hub ratio is between 0.20 and 0.40.

The turbine engine according to any other clause, wherein the fan hub ratio is between 0.29 and 0.40.

The turbine engine according to any other clause, wherein the turbine engine is a ducted turbine engine, and the fan hub ratio is between 0.20 and 0.29.

The turbine engine according to any other clause, wherein the first bearing assembly has a tight bearing configuration with a clearance between the balls and the inner and outer races of the first bearing assembly between 5 mil and 10 mil.

The turbine engine according to any other clause, wherein the clearance between the balls and the inner and outer races of the first bearing assembly is between 5 mil and 7 mil.

The turbine engine according to any other clause, wherein the inner race and the outer race of the first bearing assembly define gothic arches.

The turbine engine according to any other clause, wherein the turbine includes a high-pressure turbine, a high-pressure turbine shaft, a low-pressure turbine and a low-pressure turbine and a low-pressure turbine shaft, the low-pressure turbine shaft coupled to the epicyclic gear assembly.

The turbine engine according to any other clause, wherein the fan rotor is coupled to the ring gear.

The turbine engine according to any other clause, wherein the fan rotor is coupled to the planetary gears.

The turbine engine according to any other clause, further including a lubrication oil jet for supplying lubrication oil to the first bearing assembly and/or the second bearing assembly.

The turbine engine according to any other clause, wherein the lubrication oil jet is positioned to supply lubrication oil under the first bearing assembly, between the gothic arches of the first bearing assembly, or axially into the first bearing assembly.

The turbine engine according to any other clause, wherein the first bearing assembly and/or the second bearing assembly is formed from ceramic materials.

The turbine engine according to any other clause, wherein contact between the balls and the inner and outer races and of the first bearing assembly occurs at angles from 20 degrees to 50 degrees.

A turbine engine comprising: a turbine defining a centerline, the turbine including a turbine shaft rotatable about the centerline; a fan section including a fan rotor, a hub coupled to the fan rotor, and fan blades coupled to the hub, the fan section rotatable about the centerline, the hub having a diameter $D_1$ and the fan section having a second diameter $D_2$, wherein $D_1/D_2$ defines a fan hub ratio; a power gearbox including an epicyclic gear assembly including a sun gear, planetary gears, and a ring gear, the turbine shaft coupled to the epicyclic gear assembly, and the fan rotor coupled to another of the gears of the epicyclic gear assembly; and a fan rotor bearing support system including a first bearing assembly and a second bearing assembly, the first bearing assembly including a four point ball bearing including balls, an inner race secured to the fan rotor adjacent to the power gearbox and an outer race secured to stationary support structure of turbine engine, the first bearing assembly has a tight bearing configuration with a clearance between the balls and the inner and outer races of between 5 mil and 10 mil, the second bearing assembly including a roller bearing including an inner race secured to the fan rotor and an outer race secured to the support structure of the turbine engine, the second bearing assembly positioned distally of the first bearing assembly and proximally of the fan hub, wherein the fan hub ratio is between 0.20 and 0.40.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine comprising:
a turbine section defining a centerline, the turbine including a turbine shaft rotatable about the centerline;
a fan section including a fan rotor, a hub coupled to the fan rotor, and fan blades coupled to the hub, the fan section rotatable about the centerline, the hub having a diameter $D_1$ and the fan section having a second diameter $D_2$, wherein $D_1/D_2$ defines a fan hub ratio;
a power gearbox including a gear arrangement, the turbine shaft coupled to a first gear of the gear arrangement and the fan rotor coupled to a second gear of the gear arrangement, wherein the gear arrangement is configured to reduce a speed of the fan rotor in relation to a speed of the turbine shaft; and
a fan rotor bearing support system including a first bearing assembly and a second bearing assembly, the first bearing assembly including a four point ball bearing including balls, an inner race secured to the fan rotor adjacent to the power gearbox and an outer race secured to stationary support structure of turbine engine, the second bearing assembly including a roller bearing including an inner race secured to the fan rotor and an outer race secured to the support structure of the turbine engine, the second bearing assembly positioned distally of the first bearing assembly and proximally of the fan hub, wherein the first bearing assembly has a tight bearing configuration with a clearance between the balls and the inner and outer races of the first bearing assembly of between 5 mil and 10 mil.

2. The turbine engine of claim 1, wherein the fan hub ratio is between 0.29 and 0.40.

3. The turbine engine of claim 2, wherein the inner race and the outer race of the first bearing assembly define gothic arches.

4. The turbine engine of claim 3, wherein the turbine engine is a ducted turbine engine, and the fan hub ratio is between 0.25 and 0.29.

5. The turbine engine of claim 1, wherein the first bearing assembly has a tight bearing configuration with a clearance between the balls and the inner and outer races of the first bearing assembly of between 5 mil and 7 mil.

6. The turbine engine of claim 1, wherein the turbine section includes a high-pressure turbine, a high-pressure turbine shaft, a low-pressure turbine and a low-pressure turbine shaft, the low-pressure turbine shaft coupled to the gear arrangement.

7. The turbine engine of claim 6, wherein the gear arrangement includes an epicyclic gear assembly including a sun gear, a plurality of planet gears, and a ring gear.

8. The turbine engine of claim 7, wherein the fan rotor is coupled to the ring gear.

9. The turbine engine of claim 7, wherein the fan rotor is coupled to the plurality of planetary gears.

10. A turbine engine comprising:
a turbine section defining a centerline, the turbine section including a turbine shaft rotatable about the centerline;
a fan section including a fan rotor, a hub coupled to the fan rotor, and fan blades coupled to the hub, the fan section rotatable about the centerline, the hub having a diameter $D_1$ and the fan section having a second diameter $D_2$, wherein $D_1/D_2$ defines a fan hub ratio;
a power gearbox including an epicyclic gear assembly including a sun gear, planetary gears, and a ring gear, the turbine shaft coupled to one gear of the epicyclic gear assembly, and the fan rotor coupled to another of the gears of the epicyclic gear assembly; and a fan rotor bearing support system including a first bearing assembly and a second bearing assembly, the first bearing assembly including a four point ball bearing including balls, an inner race secured to the fan rotor adjacent to the power gearbox and an outer race secured to stationary support structure of turbine engine, the second bearing assembly including a roller bearing including an inner race secured to the fan rotor and an outer race secured to the support structure of the turbine engine, the second bearing assembly positioned distally of the first bearing assembly and proximally of the fan hub, wherein the fan hub ratio is between 0.25 and 0.40, wherein the first bearing assembly has a tight bearing configuration with a clearance between the balls and the inner and outer races of the first bearing assembly of between 5 mil and 10 mil.

11. The turbine engine of claim 10, wherein the fan hub ratio is about 0.40.

12. The turbine engine of claim 11, wherein the turbine engine is a ducted turbine engine, and the fan hub ratio is between 0.25 and 0.29.

13. The turbine engine of claim 12, wherein the first bearing assembly has a tight bearing configuration with a clearance between the balls and the inner and outer races of the first bearing assembly of between 5 mil and 10 mil.

14. The turbine engine of claim 13, wherein the clearance between the balls and the inner and outer races of the first bearing assembly is between 5 mil and 7 mil.

15. The turbine engine of claim 10, wherein the turbine section includes a high-pressure turbine, a high-pressure turbine shaft, a low-pressure turbine and a low-pressure turbine shaft, the low-pressure turbine shaft coupled to the epicyclic gear assembly.

16. The turbine engine of claim 10, wherein the fan rotor is coupled to the ring gear.

17. The turbine engine of claim 10, wherein the fan rotor is coupled to the planetary gears.

18. A turbine engine comprising:

a turbine section defining a centerline, the turbine section including a turbine shaft rotatable about the centerline;

a fan section including a fan rotor, a hub coupled to the fan rotor, and fan blades coupled to the hub, the fan section rotatable about the centerline, the hub having a diameter $D_1$ and the fan section having a second diameter $D_2$, wherein $D_1/D_2$ defines a fan hub ratio;

a power gearbox including an epicyclic gear assembly including a sun gear, planetary gears, and a ring gear, the turbine shaft coupled to the epicyclic gear assembly, and the fan rotor coupled to another of the gears of the epicyclic gear assembly; and a fan rotor bearing support system including a first bearing assembly and a second bearing assembly, the first bearing assembly including a four point ball bearing including balls, an inner race secured to the fan rotor adjacent to the power gearbox and an outer race secured to stationary support structure of turbine engine, the first bearing assembly has a tight bearing configuration with a clearance between the balls and the inner and outer races of between 5 mil and 10 mil., the second bearing assembly including a roller bearing including an inner race secured to the fan rotor and an outer race secured to the support structure of the turbine engine, the second bearing assembly positioned distally of the first bearing assembly and proximally of the fan hub, wherein the fan hub ratio is between 0.25 and 0.40, wherein the first bearing assembly has a tight bearing configuration with a clearance between the balls and the inner and outer races of the first bearing assembly of between 5 mil and 10 mil.

* * * * *